United States Patent [19]

Dabbous

[11] 4,129,182
[45] Dec. 12, 1978

[54] MISCIBLE DRIVE IN HETEROGENEOUS RESERVOIRS

[75] Inventor: Mahmoud K. Dabbous, Tulsa, Okla.

[73] Assignee: Standard Oil Company (Indiana), Chicago, Ill.

[21] Appl. No.: 772,888

[22] Filed: Feb. 28, 1977

[51] Int. Cl.² .................... E21B 33/138; E21B 43/22
[52] U.S. Cl. .................... 166/263; 166/271; 166/273; 166/281; 166/245
[58] Field of Search ............ 166/263, 252, 256, 261, 166/273, 274, 281, 294, 271, 295, 292, 281

[56] References Cited

U.S. PATENT DOCUMENTS

| | | | |
|---|---|---|---|
| 3,285,338 | 11/1966 | Boston | 166/273 X |
| 3,437,141 | 4/1969 | Brandner et al. | 166/273 |
| 3,464,491 | 9/1969 | Froning | 166/294 X |
| 3,491,832 | 1/1970 | Raza | 166/273 X |
| 3,520,366 | 7/1970 | Jones | 166/273 |
| 3,612,179 | 10/1971 | Anderson et al. | 166/281 |
| 3,682,245 | 8/1972 | Argabright et al. | 166/294 X |
| 3,882,938 | 5/1975 | Bernard | 166/273 X |
| 3,981,363 | 9/1976 | Gall | 166/294 X |

*Primary Examiner*—Stephen J. Novosad
*Attorney, Agent, or Firm*—John D. Gassett

[57] ABSTRACT

A method of improving the sweep efficiency and increasing oil recovery of miscible flooding without reducing injectivity of the injection wells. Two sets of wells are used with one set being drilled between the other sets. The interwell area of a reservoir is pretreated by injecting a permeability-reducing agent (preferably a polymer) through said first set of wells. The polymer enters the more permeable zones and partially plugs them, both near and away from the wellbore. Thereafter, the injection or first set of wells are converted to producing wells. After the step of reducing the permeability contrast of the heterogeneous reservoirs, a miscible slug, that may or may not be preceded by a controlled salinity preflush, is injected into the second set of wells. There is no reduction in injectivity of the miscible injection wells, becuse no permeability-reducing agent has been injected therethrough. Reduced permeability contrast results in improved volumetric sweep efficiency and increased oil recovery by the miscible fluid slug. The method is particularly useful in reservoirs with communication between various permeability zones where crossflow of fluids can be detrimental to flooding efficiency.

1 Claim, 7 Drawing Figures

3. MISCIBLE FLOOD STEP

UNIFORM FRONTAL ADVANCE FOLLOWING PERM. "UNIFICATION"

∅ POLYMER INJECTION WELLS LATER CONVERTED TO PRODUCERS

● MISCIBLE AND CHASE FLUIDS INJECTION WELLS

1. INTERWELL PERMEABILITY "UNIFICATION" STEP

2. PRODUCER STIMULATION STEP

3. MISCIBLE FLOOD STEP

UNIFORM FRONTAL ADVANCE
FOLLOWING PERM. "UNIFICATION"

MISCIBLE DRIVE IN HETEROGENEOUS RESERVOIRS

BACKGROUND OF THE INVENTION

1. Field of Invention

The present invention relates to the recovery of petroleum fluids from an underground reservoir. It relates primarily to tertiary recovery of oil, i.e., the recovery of the oil remaining after waterflood operations.

2. Setting of the Invention

As is well-known, petroleum is found in reservoirs ranging from shallow to very deep and is produced by drilling boreholes into the reservoir. The first stage of producing oil from an underground reservoir is commonly referred to as the primary production stage. During this period of time, oil flows into the wellbore under natural forces, and if the natural forces are sufficiently great, the oil flows to the surface through the wellbore where it is recovered. After the natural pressures have been depleted to a certain extent, it may be necessary to put pumps in the wellbore to pump the fluid from the wellbore to the surface. By this method of production, it is normally possible to obtain only from about 5% to 15% of the oil originally in-place. After the primary production has been depleted, it is a common practice to institute secondary recovery operations. One of the more common secondary recovery operations is the so-called waterflooding technique, wherein water is injected into injection wells and drives oil toward a second set of wells, called producing wells. This can sometimes recover an additional 50% maximum of the original oil in the reservoir. Even after waterflooding, there remains a large part of the original oil still unproduced and remaining in the reservoir. This could be up to 30%, 40%, or even 50% or more of the original oil in-place. Tertiary recovery methods have been developed and are being developed in an effort to obtain a good part of this remaining oil. A most common method is where a fluid miscible or partially miscible with the reservoir oils is injected through injection wells to drive oil to the producing wells. A major problem in tertiary recovery is that all reservoirs are heterogeneous, i.e., there are some streaks that are more permeable to the flow of fluid therethrough than other portions of the reservoir. Thus, when an oil recovery driving fluid is injected through the wells, it tends to go through these more permeable zones, bypassing the less permeable zones and leaving significant amounts of oil therein. One method of trying to reduce this "channeling" or breakthrough process that has been proposed is to inject mobility-reducing fluids through the injection wells prior to injecting the miscible fluid in an effort to partially block flow in the more permeable zones of the reservoir. This latter procedure normally tends to greatly reduce the injectivity of the injection wells, i.e., the oil recovery fluid cannot be injected at nearly as high a rate as before the mobility-reducing agent was injected therein.

Prior Art

I know of no prior art that anticipates my invention. However, I do wish to call attention to three patents. It is believed the first patent describing the miscible drive is R. A. Morris, U.S. Pat. No. 3,354,953, issued Nov. 28, 1967, and filed June 14, 1952. It has been suggested to improve the recovery of the miscible drive by improving its sweep efficiency by reducing mobility in the the more permeable zone in order to obtain a more uniform sweep in the reservoir near the wellbore. U.S. Pat. No. 3,704,990, patented Dec. 5, 1972, teaches the injection of an aqueous solution of a water-soluble polymer ahead of a solvent miscible with the reservoir oil to obtain mobility reduction in the more permeable zone. U.S. Pat. No. 3,308,885, patented Mar. 14, 1967, relates to methods for decreasing the water-oil ratio in the total well effluent. In that patent there is injected into the formation through a producing well an aqueous solution of a high molecular weight, water-soluble, polyacrylamide, where about 8%, but not more than about 70% of the amide groups have been hydrolized to carboxylic acid groups. The immediate effect of the treating process of the invention of this patent is to decrease the rate of flow of water into the wellbore and is not concerned with smoothing the permeability profile of the interwell area of the reservoir as is the invention disclosed herein.

BRIEF DESCRIPTION OF THE INVENTION

This invention concerns a novel way of improving the volumetric sweep efficiency of a driving fluid, particularly in a tertiary recovery system without reducing injectivity in the oil-bearing formation. I use two sets of wells—a first set interspersed between a second set. All oil-containing reservoirs are heterogeneous in one or more respects. For example, permeability profiles of a reservoir show that the reservoir varies in permeability considerably throughout its volume. This lowers the sweep efficiency of a driving fluid project such as a miscible flood, in that the miscible fluid, for example, goes through the more permeable portions of the reservoir, bypassing the less permeable portions, thus tending to leave considerable oil in the reservoir. My method is a novel way of effecting a smoothing of the permeability profile of the reservoir. I reduce the interwell permeability contrast by injecting a fluid, such as a polymer, through the first set of wells (which will later become the producing wells). After I have introduced a sufficient volume of polymer into the first set of wells, I drive it out into the interwell area by subsequent water injection. Then I convert those wells to producing wells. The first set of wells may or may not be stimulated prior to its conversion to producers. I then inject an oil recovery fluid through the second set of wells, which are the true injection wells for the tertiary recovery project. This drives at least a good portion of the remaining reservoir oil to the producing wells in the first set of wells. I am able to maintain a high injectivity rate in the injection wells, because I have not injected a permeability-reducing agent through them. Therefore, the method combines the features of the improved sweep-efficiency and improved oil recovery by miscible flooding without reducing the injectivity of the oil recovery fluid and subsequently injected chase fluids. Another advantage is the expected reduction in water production at the producing wells if the permeability-reducing agent, which has been injected, is a polymer.

DRAWINGS

A better understanding of the invention may be had from the following detailed description taken in conjunction with the drawings.

DETAILED DESCRIPTION OF THE INVENTION

Figure 1:
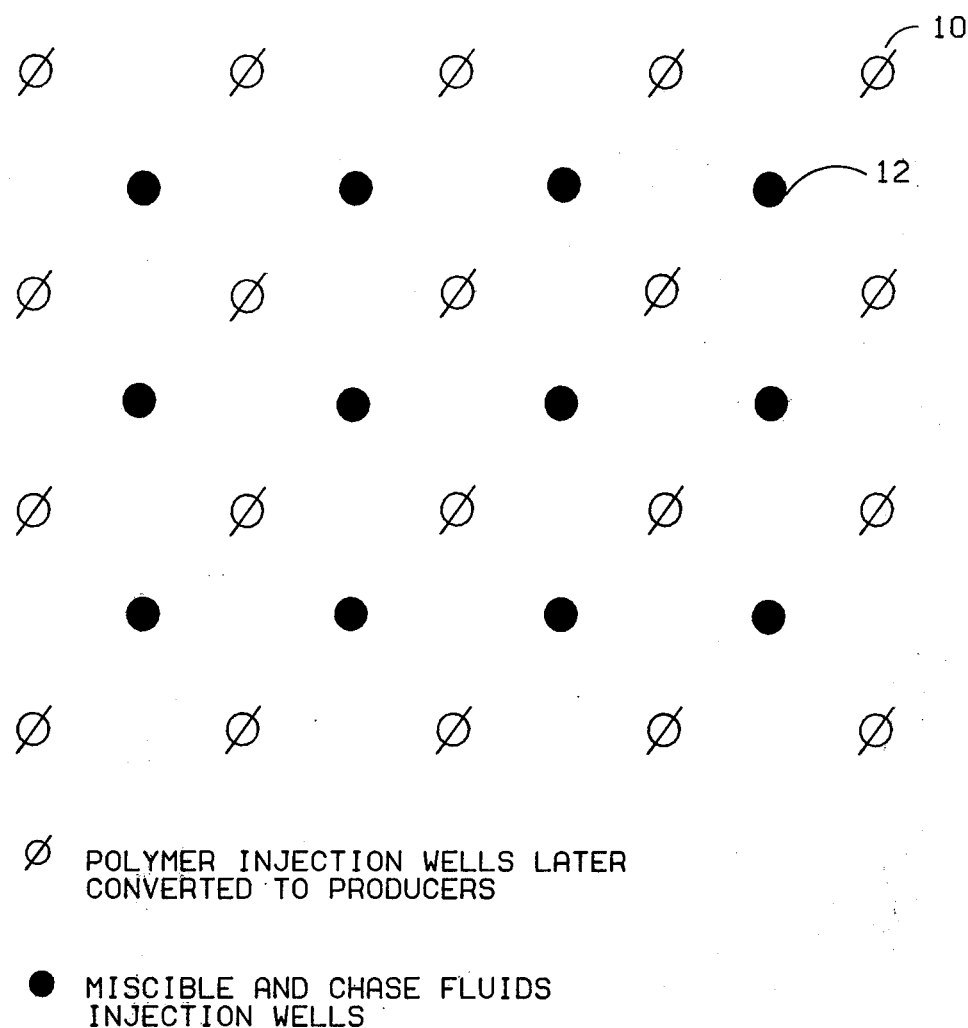
FIG. 1 illustrates a well pattern useful in practicing this invention.

Attention is first directed to FIG. 1, which illustrates a well pattern configuration useful for practicing this invention. Other configurations and number of wells can be used, of course. Shown in FIG. 1 are a first set of wells 10 dispersed between a second set of wells 12. This configuration may be called a five-spot pattern. The second set of wells 12 are the (permanent) injection wells through which the tertiary recovery drive fluids are to be injected. These injection wells 12 are drilled in a pattern such as shown in FIG. 1 in a rectangular pattern and typically are drilled in the center of a 10-acre tract or a 40-acre tract, for example, depending upon many factors such as depth of the reservoir characteristics, etc. However, before injecting an oil recovery fluid, a first set of wells 10 is drilled in the area between the injection wells 12. This first set of wells may already be drilled and are selected for this purpose. The first set of wells 10 is used for injecting a permeability-reducing fluid into the interwell area of the reservoir between the permeability-reducing first set of wells 10 and the second set of wells 12. Particularly suitable permeability-reducing fluids are polymers, which appear to have a natural selectivity to flowing zones of high permeability, high water saturations, and large pores. The polymer may or may not be crosslinked or gelled in situ to obtain a greater degree of permeability reduction. Foam or gel can also be used as a permeability-reducing agent. A foam is generated by the simultaneous or sequential injection of a foaming agent (such as a surfactant) and gas. By polymer, I mean solutions of polyacrylamides that may or may not be partially hydrolized and may or may not be crosslinked or gelled in situ. A polymer is a compound which consists of many repeating structural units.

Figure 3:
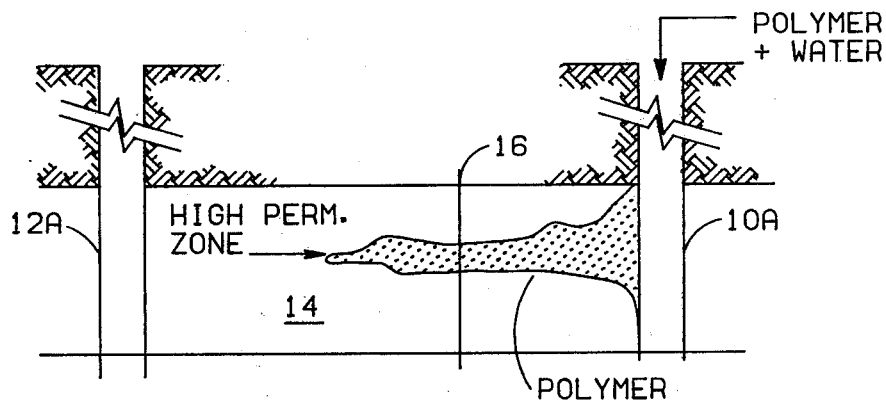
FIG. 3 illustrates a vertical view of a heterogeneous reservoir illustrating a permeability unification step.
Figure 4:
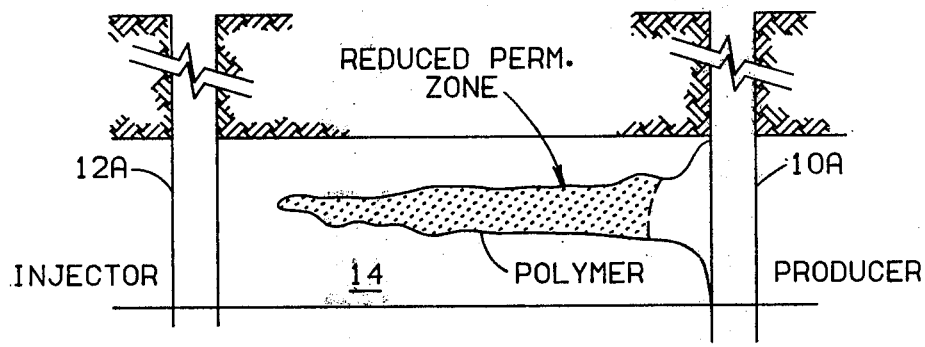
FIG. 4 illustrates the same reservoir as FIG. 3, but shows the producer well stimulation step.
Figure 5:
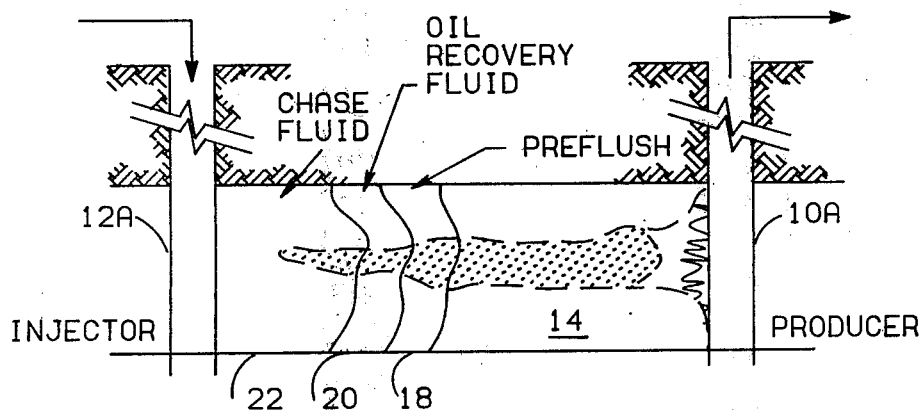
FIG. 5 illustrates the same cross section as that in FIGS. 3 and 4 and illustrates a miscible fluid drive with a chase fluid.

Attention is next directed to FIGS. 3, 4, and 5, which help explain the invention and the use of the well pattern in FIG. 1. In FIG. 3 there is illustrated the interwell permeability unification step. Shown are producing well 10A, an injection well 12A, and an interwell area 14. A permeability-reducing agent such as a polymer is injected in well 10A in a sufficient amount fo flow into the interwell area 14 of the oil reservoir. The polymer should be injected in sufficient amount to be displaced throughout the interwell area by subsequent water injection. A typical path of the polymer is shown in FIG. 3. By injecting the polymer as in this case, if one would take a permeability profile along a vertical plane, indicated by line 16, it would be considerably smoothed from that prior to injecting the polymer.

As shown in FIG. 4, it is desirable to inject sufficient polymer to reach nearly to the injection well 12A in the high permeability streaks and short of breakthrough at well 12A when displaced by a driving fluid such as water in order to increase the sweep efficiency of most of the reservoir volume between the wells 10A and 12A. It will usually be desirable to conduct a stimulation step on well 10A, which is converted to a producer after the injection and displacement of polymer. Suitable stimulation methods are acidizing, fracturing, or acid fracturing.

Attention is next directed to FIG. 5, which shows the tertiary flood step. Sometime it is desirable to have a salinity preflush through injection well 12A prior to the injection of a surfactant slug. For a discussion of surfactant and miscible flooding, attention is directed to the publications: Gogarty, W. B. and Tosch, W. C.: Miscible-Type Waterflooding: Oil Recovery with Micellar Solutions, J. Pet. Tech. (December 1968), and Craig, F. F., Jr., and Owens, W. W., "Miscible Slug Flooding—A review," J. Pet. Tech. (April, 1960) The preflush is indicated by bank 18, which is followed by a micellar fluid bank 20, and a chase fluid 22. This drives oil in the reservoir toward well 10A, which has been converted to a producer well. The polymer introduced into the reservoir through the first set of wells is preferably the type which leaves behind a residual resistance phase and causes permanent reduction in permeability to the driving fluid. Thus, the miscible drive is forced to take a more uniform sweep of the entire reservoir between injection well 12A and producer 10A. It is to be noted that a permeability-reducing agent, such as a polymer was never introduced through injection well 12A. Thus, its injectivity has not been damaged by any possible permeability reduction caused by that particular permeability-reducing agent. Thus, the method combines the features of improved sweep efficiency and improved oil recovery by miscible flooding without reducing injectivity into the formation of the tertiary oil recovery fluid and also the subsequently injected chase fluids.

Figure 2:
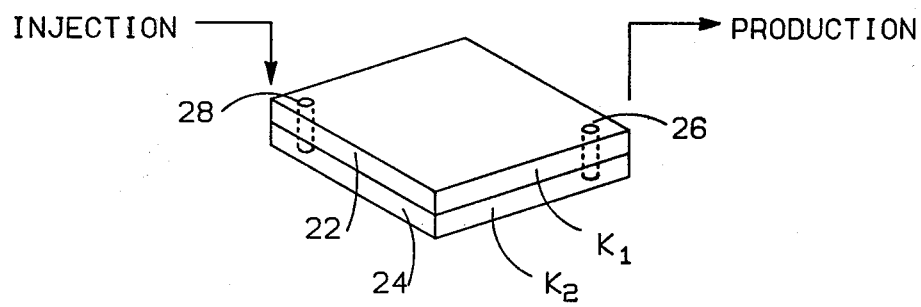
FIG. 2 illustrates a two-layer, five-spot model in which experiments were run relating to this invention.

I have run laboratory tests in models which show that more than 75% recovery of the oil in-place was obtained using the method of my invention with the treatment of reducing the permeability contrast compared to only 63% recovery in a test in which there was no pretreatment of reducing the high permeability portion before the miscible flood. Attention is first directed to FIG. 2, which shows a two-layer, five-spot model I used in these tests. There is an upper layer 22 and a lower layer 24 having permeability to oil of $K_1$ and $K_2$, respectively. The model, shown in FIG. 2, is of heterogenous, porous medium and is made from biporous filtros slabs 12 by 12 by 1½ inches. This synthetic, porous medium has two layes of different permeability parallel to the 12 by 12 inch base and are in capillary contact. Heterogeneity of the model was due to the contrast in the range two- to fivefold in permeability of the two layers. The biporous slabs were encapsulted in epoxy and injection and production wells were drilled at the corners. The fact that the layers are in capillary contact enables the fluids to crossflow from the low into the high permeability zone or layer in the interwell area. These models were flooded from corner to corner, thus simulating flow in an isolated quadrant of the five-spot pattern. An injection well 28 and a producing well 26 are shown in FIG. 2. I will now show the results of two comparative tests conducted in two heterogeneous, five-spot models. In one test the model was not pretreated with polymer injection. In the second test the model was treated with polymer preinjection for permeability profile smoothing prior to conducting a tertiary flood.

Figure 6:
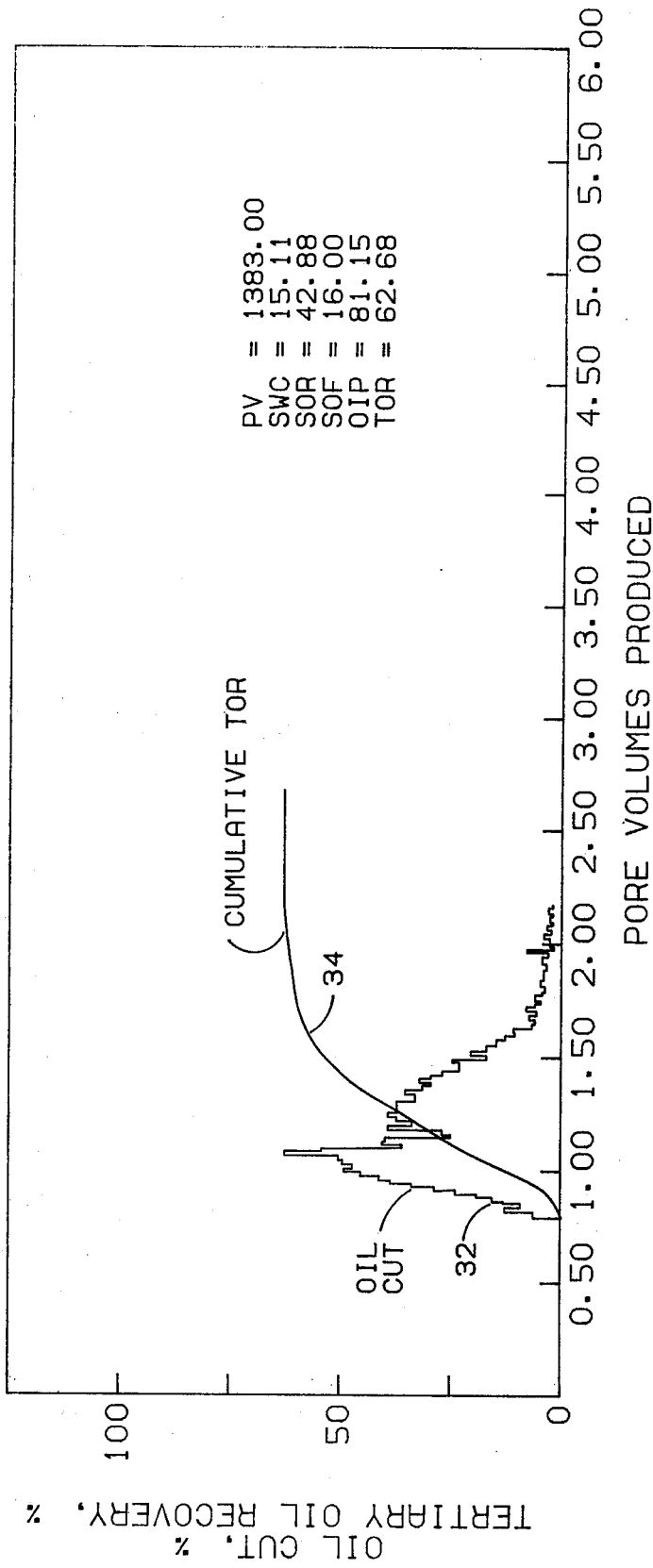
FIG. 6 is curves illustrating test data from micellar flooding in a model such as illustrated in FIG. 2 and in which there was no pretreatment with a permeability-reducing fluid.

FIG. 6 shows the results of a micellar flood test which was conducted in the heterogeneous, five-spot model of a biporous filtros as illustrated in FIG. 2. For this test the model was flooded out to waterflood residual saturation (SOR). The original oil in place (OIP) was about 81.2%. When this model was flooded with the micellar fluid slug, displaced by a mobility buffer bank and chase water, 62.7% of the oil in-place left behind after waterflooding was recovered. Thus, the tertiary oil recovery (TOR) in this case amounted to 62.7%. The final oil saturation (SOF) in the model after micellar flooding was 16% pore volume (PV). The bar curve 32 shows the tertiary oil cut and the oil response to micellar flooding in this test. The second curve 34 on the figure shows the cumulative tertiary oil recovered by micellar flooding in the model. (The final tertiary oil recovery is shown to be 62.7%.) The highest oil cut shown here is about 50% to 55%.

Figure 7:
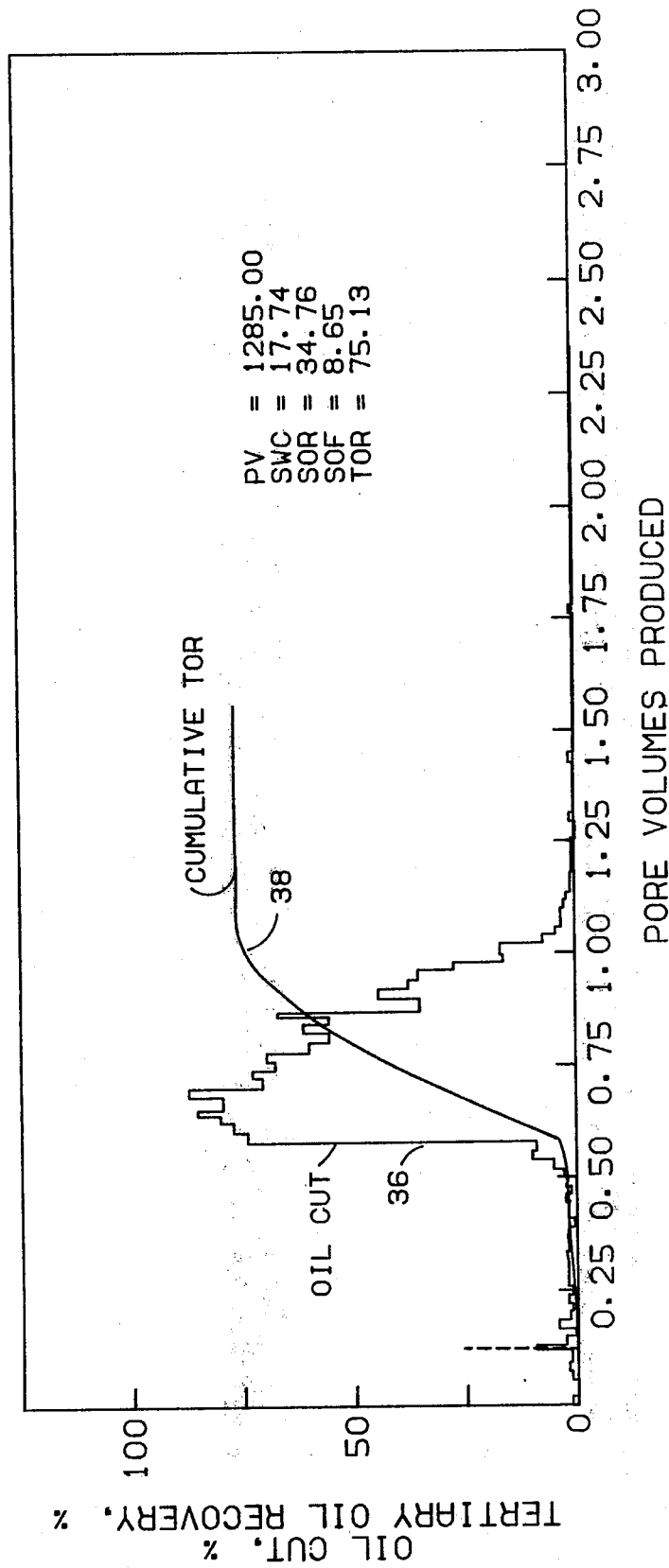
FIG. 7 is similar to FIG. 6, except in this case the data plotted is from a micellar flooding in which the model was pretreated with a permeability-reducing fluid.

FIG. 7 shows the results of a micellar flood test in a heterogeneous five-spot model also made from biporous filtros slabs. In this case the model was pretreated with a high molecular weight, polyacrylamide polymer prior to micellar flooding. This treatment was conducted through the well which was later converted to a producer. A polymer slug of about 18% pore volume was injected and displaced through the model into the interwell area from this well. Micellar flooding was conducted through the second well, which was the injector for the micellar flood sequence. In this case the tertiary oil recovery by micellar flooding was 75% of the oil left behind after waterflooding and only 8.7% final oil saturation was left in the model. This, the high recovery efficiency and the high volumetric sweep efficiency are demonstrated by the higher tertiary oil recovery and the lower final oil saturation after flooding. The producing oil cut 36 was also considerably higher in the case where the model was pretreaed with polymer injection. In this second test, leading oil cuts were greater than 50% and considerable initial production was at oil cuts around 70% and 75%. The cumulative tertiary oil recovery curve 38 shows that the final tertiary oil recovery is at about 75% in this test.

The results of these tests just described are summarized in TABLE I.

TABLE I
RESULTS OF FLOOD TESTS IN TWO-LAYER FIVE-SPOT MODELS

| | 1st Test (FIG. 6) No Interwell Pretreatment | 2nd Test (FIG. 7) Interwell Pretreatment |
|---|---|---|
| Model Description | Two-Layer Five-Spot | Two-Layer Five-Spot |
| Initial Permeability Contrast, $K_1:K_2$ | 2:1 | 4:1 |
| Polymer Pretreatment | None | 18% PV ICI 2060 Polymer (400 ppm) Injected and Displaced from Production Well Side |
| Initial Oil Saturation, $S_{oi}$ % PV* | 84.9 | 82.3 |
| Waterflood Residual Oil Saturation, $S_{or}$ % PV | 43 | 34.8 |
| Micellar Flood Residual Oil Saturation, $S_{of}$ % PV | 16 | 8.7 |
| Tertiary Oil Recovery, Percent Oil In-Place | 63 | 75 |
| Volumetric Sweep: Breakthrough of Tracer in Water, % PV | 21 | 27 |
| Breakthrough of Tracer in Miscible Slug, % PV | 28 | 45 |
| Breakthrough of Tracer in Polymer Bank, % PV | 27 | 57 |

*PV - Pore volume

The pertinent data show a brief description of the two models and indicates that in one test an 18% PV of a high molecular weight polyacrylamide solution was injected, whereas in the second test, no polymer was preinjected. Initial oil saturations are similar at about 82% to 85% PV. The final oil saturation after micellar flooding in the test where a permeability unification step with polymer was conducted was down to to 8.7%, whereas in the test where no polymer was preinjected in the model, the final oil saturation was 16%. In the test where the model was pretreated with polymer, the tertiary oil recovery is 75% of the oil left behind after waterflooding, whereas in the test where no polymer was preinjected, this tertiary oil recovery amounted to only 63%. Thus, there is a significant improvement to oil recovery by micellar flooding, when a heterogeneous model was pretreated with a high molecular weight polyacrylamide polymer injected into the model through the producing well into the interwell area. The increase in oil production demonstrates an increased flooding efficiency. The improvement in volumetric sweep efficiency is also demonstrated by the results of the two tests where fluid tracers were used to monitor fluid banks movement in the heterogeneous models. The initial water breakthrough volumetric sweep is 27% and 21% PV, respectively, in the two tests and this breakthrough sweep efficiency was improved or increased to 45% for the micellar fluid bank when the model was pretreated with polymer as compared to 28% only in the case where no polymer was preinjected. Thus, the definite improvement in volumetric sweep efficiency is evident by the delayed breakthrough of the micellar of miscible fluid bank tracer in the second test (results in FIG. 7). The polymer bank used to chase the micellar fluid also indicates the same feature of improvement in volumetric sweep at breakthrough. The volumetric sweep at breakthrough for the mobility drive bank is 57% PV in the model pretreated with polymer, whereas the volumetric sweep for the same bank in the model which was not pretreated with polymer was only 27% PV.

While the above description has been done in a rather detailed manner, it is possible to make variations thereon without departing from the spirit or the scope of the invention.

What is claimed is:

1. A method of recovering oil from an underground reservoir in which a first well has been drilled which comprises:

(a) drilling a second well into said underground reservoir;
(b) injecting a permeability-reducing foam through said first well into said reservoir in sufficient quatity to extend into an interwell area but short of breaking through at said second well when displaced by chase fluid to improved volumetric sweep;
(c) at all times restricting the fluid injected through said second well to a non-permeability reducing fluid so as not to impair the injectivity of said second well;
(d) thereafter injecting an oil recovery fluid into said reservoir through said second well spaced from said first well to drive oil through said reservoir toward said first well, there being no permeability-reducing fluid injected through said second well;
(e) then producing driven oil through said first well.

* * * * *

UNITED STATES PATENT OFFICE
CERTIFICATE OF CORRECTION

PATENT NO. : 4,129,182
DATED : December 12, 1978
INVENTOR(S) : Mahmoud K. Dabbous It is certified that error appears in the above-identified patent and that said Letters Patent are hereby corrected as shown below:

Claim 1, column 7, line 5, "quatity" should be --quantity--.

Claim 1, columns 7 and 8, the order of prior steps (c) and (d) should be reversed.

Signed and Sealed this

Twenty-ninth Day of May 1979

[SEAL]

Attest:

RUTH C. MASON
Attesting Officer

DONALD W. BANNER
Commissioner of Patents and Trademarks